United States Patent [19]

Sutker

[11] Patent Number: 4,564,697

[45] Date of Patent: Jan. 14, 1986

[54] HALOGENATED POLYOL-ESTER NEUTRALIZATION AGENT

[75] Inventor: Burton J. Sutker, Edison, N.J.

[73] Assignee: Ethyl Corporation, Richmond, Va.

[21] Appl. No.: 676,433

[22] Filed: Nov. 29, 1984

[51] Int. Cl.[4] .................. C07C 69/82; C07C 69/753
[52] U.S. Cl. ...................................... 560/83; 560/99; 560/120; 528/74; 528/80
[58] Field of Search .............. 560/65, 99, 120, 125, 560/83

[56] References Cited

U.S. PATENT DOCUMENTS

| | | | |
|---|---|---|---|
| 3,278,580 | 10/1966 | Worsley | 560/120 |
| 3,455,886 | 7/1969 | Versnel | 260/78.4 |
| 3,531,415 | 9/1970 | Reymore | 560/120 |
| 3,585,185 | 6/1971 | Levis | 560/120 |
| 3,715,383 | 2/1973 | Praetzel | 560/83 |
| 3,823,176 | 7/1974 | Levis | 560/83 |
| 3,869,502 | 3/1975 | Papa | 560/120 |
| 3,929,866 | 12/1975 | Baldino | 560/83 |
| 4,144,395 | 3/1979 | Murphy | 560/120 |

OTHER PUBLICATIONS

Pape et al., "J. Cellular Plastics", Nov. 1968, pp. 438–442.

Primary Examiner—C. Warren Ivy
Attorney, Agent, or Firm—Donald L. Johnson; John F. Sieberth; Joseph D. Odenweller

[57] ABSTRACT

Haze-free reactive flame retardant halo polyols are made by reacting (a) a halogen containing cyclic acid anhydride (e.g. tetrabromophthalic anhydride), (b) an aliphatic polyol, e.g. diethylene glycol, and (c) an epoxide, e.g. propylene oxide, and including potassium salt of fatty acids (e.g. potassium acetate) in the reaction mixture in an amount at least sufficient to neutralize residual sulfuric acid that is usually present in the halogen containing cyclic acid anhydride.

21 Claims, No Drawings

HALOGENATED POLYOL-ESTER NEUTRALIZATION AGENT

BACKGROUND OF THE INVENTION

Halogenated flame retardant polyols made by reaction of a halogen containing cyclic acid anhydride, a polyol and an epoxide are described in Versnel U.S. Pat. No. 3,455,886. Preparation of such compounds using tetrabromophthalic anhydride as the cyclic acid anhydride is set forth in Pape et al, "J. Cellular Plastic", Nov. 1968, p. 438–442. Use of magnesium oxide and sodium acetate to neutralize the residual sulfuric acid is described. Although both magnesium oxide and sodium acetate have been found to be effective neutralizing agents, they unfortunately result in the formation of a hazy product which is objectionably from a commercial view point. Thus a need exists for a means of neutralizing the reaction product to form a commercially acceptable haze-free reactive flame retardant.

SUMMARY OF THE INVENTION

It has now been discovered that haze-free reactive halogen containing polyol flame retardants can be made from the reaction of (a) a halogenated cyclic acid anhydride, (b) an aliphatic polyol and (c) an epoxide using a potassium salt of a fatty acid to neutralize residual sulfuric acid. Such halogenated polyols can be used in the manufacture of polyurethanes and polyesters to provide flame retarded polymers.

DESCRIPTION OF THE PREFERRED EMBODIMENTS

A preferred embodiment of the invention is an improvement ment in a process for making a flame retardant halogenated polyol by reacting (a) an aliphatic polyol with (b) a halogenated cyclic acid anhydride which contains residual sulfuric acid and (c) an epoxide. The improvement comprises adding a potassium salt of a lower fatty acid to the reaction mixture in an amount at least sufficient to substantially neutralize the residual sulfuric acid to give a halogenated polyol product having a pH of about 5.0–9.0 and which is substantially haze-free.

The reactive flame retardants can be made using any of a broad range of halogen containing cyclic acid anhydrides. Some examples of these are 2,3-dibromosuccinic anhydride
2,3-dichlorosuccinic anhydride
3,5-dibromophthalic anhydride
4,5-dichlorophthalic anhydride
3,4,5-tribromophthalic anhydride
3,4,5-trichlorophthalic anhydride
3,4,5,6-tetrabromophthalic anhydride
3,4,5,6-tetrachlorophthalic anhydride
1,4,5,6,7,7-hexachloro-(2,2,1)-5-heptene-2,3-dicarboxylic anhydride
1,4,5,6,7,7-hexabromo-(2,2,1)-5-heptene-2,3-dicarboxylic anhydride.

Such cyclic acid anhydrides are generally made by bromination of the cyclic acid anhydride in sulfuric acid and for that reason most contain residual sulfuric acid. The amount of sulfuric acid can range from about 0.1 to 0.3 weight percent.

Useful aliphatic polyols include ethylene glycol, propylene glycol, 1,6-hexanediol, glycerol, trimethylolethane, trimethylolpropane, pentaerythritol, dipentaerythritol, sucrose, glucosides, 1,4-butanediol and the like. The most useful polyols are the polyalkylene glycols such as polyethylene glycol, polypropylene glycol, polybutylene glycol, mixed polyethylenepropylene glycols and the like wherein each molecule can contain from 2 to about 20 alkylene oxide units. Superior results are obtained with polyethylene glycols or mixtures of polyethylene glycols. The most preferred aliphatic polyol is diethylene glycol or mixtures of polyethylene glycols that are mainly diethylene glycol.

Useful epoxides include any epoxides which contains from 2 to about 20 carbon atoms. Examples of these are ethylene oxide, 1,2-propylene oxide, 1,2-butylene oxide, 2,3-butylene oxide, 1,2-epoxy hexane, 1,2-epoxy dodecane, styrene oxide, epichlorohydrin and the like. The preferred epoxides are ethylene oxide and 1,2-propylene oxide, especially propylene oxide.

Other typical aliphatic polyols, halogenated cyclic acid anhydrides and epoxides will be apparent to any chemist knowledgeable in this area because these are known in the prior art and are not the essential features of the invention.

The ratio of reactants used in the process is best stated in terms of equivalents. An equivalent weight of a cyclic acid anhydride is one-half its molecular weight. An equivalent weight of an aliphatic polyol is its molecular weight divided by the number of reactive hydroxyl groups. An equivalent weight of a monoepoxide is one-half its molecular weight. A useful reactant ratio is 1.0 equivalent of cyclic acid anhydride:0.5–10 equivalents of aliphatic polyol:0.5–20 equivalents of epoxide. A more preferred reactant ratio is 1.0 equivalent of cyclic acid anhydride:0.75–2.0 equivalents of polyol:1–10 equivalents of epoxide. A most preferred reactant ratio is 1.0 equivalent of cyclic acid anhydride:0.9–1.5 equivalents of aliphatic polyol: 1–5 equivalents of epoxide.

Any of a number of potassium salts of fatty acids can be used such as potassium formate, acetate, propionate, butyrate, valerate, hexanoate, octanoate, decanoate, laurate and the like including all isomers and mixtures of such salts. The more preferred salts are the potassium salts of $C_{2-4}$ fatty acids and the most preferred salt is potassium acetate.

The amount of potassium salt should be sufficient to at least neutralize the residual sulfuric acid in the halogenated cyclic acid anhydride. Preferably there should be about 1.0–1.5 equivalents of potassium salt per equivalent of residual sulfuric acid. A more preferred range is about 1.1–1.25 equivalents per equivalent of residual sulfuric acid. In any event, the amount of potassium salt should be sufficient to neutralize the reaction mixture to a pH in the range of about 5.0–9.0, more preferably 7.0–8.0.

The potassium salt can be added as a dry powder or as a solution. It can be dissolved in water or a lower alcohol such as methanol, ethanol or isopropanol or mixtures thereof or aqueous mixtures thereof. Other solvents can be included as long as they do not react with the components of the reaction mixture. Addition as a dry powder is most preferred.

The potassium salt can be added at any stage in the reaction. In a preferred embodiment the aliphatic polyol is charged to a reaction vessel followed by the potassium salt. Then the cyclic anhydride is reacted with the aliphatic polyol at a temperature high enough to cause the esterification to proceed but not so high as to cause extensive decomposition. A useful range is about 100°–150° C. A more preferred range is about 120°–140° C. and a most preferred range is about 120°–135° C. Water may be distilled out during this esterification reaction. This reaction should be conducted until monoesterification of the cyclic acid anhydride is substantially complete to form an acid-ester intermediate. This usually requires about 30 minutes to 8 hours.

Following this the epoxide reactant is added at a controlled rate and at a temperature at which it will react with the remaining carboxylic acid group. Any excess epoxide usually reacts with hydroxyl groups to form hydroxy-terminated polyalkoxy chains. A useful reaction temperature is about 100°–160° C., more preferably about 120°–150° C. and most preferably about 12°–140° C. This reaction is conducted until the desired amount of epoxide has reacted.

The manner in which the reaction is conducted can be readily perceived in the following examples.

EXAMPLE 1

In a reaction vessel was placed 222.8 g of diethylene glycol and 3.98 g (1.3 theories based on $H_2SO_4$ content of the anhydride) of powdered potassium acetate. This was stirred and heated to 130° C. Then 695.4 g of tetrabromophthalic anhydride containing residual $H_2SO_4$ was added in 10 equal parts at 5 minute intervals. Then 144.7 g of propylene oxide was added dropwise at 130° C. The reaction was stirred at 130° C for 1.5 hours. Vacuum was then applied at 130° C. for 1 hour to remove any unreacted propylene oxide. Analysis of the product showed pH 7.11, acid no. 0.02, hydroxyl no. 220, Br 45.32 weight percent, product yellow with moderate haze.

Examples 2–7 were conducted in the same manner as Example 1 with the modification shown in the following table.

|  | Example No. | | | | | |
| --- | --- | --- | --- | --- | --- | --- |
|  | 2 | 3 | 4 | 5 | 6 | 7 |
| Diethylene glycol (g) | 117.4 | 222.8 | 891.2 | 222.8 | 891.2 | 222.8 |
| Potassium acetate (g) | 3.14 | 1.9 | 7.8 | 3.4 | 13.7 | 3.4[1] |
| Catalyst theories[2] | — | 0.62 | 0.43 | 1.11 | 1.12 | 1.11 |
| Tetrabromophthalic anhydride (g) | 556.3 | 695.4 | 2781.6 | 695.4 | 2781.6 | 695.4 |
| Propylene oxide (g) | 115.7 | 144.7 | 578.7 | 144.7 | 578.7 | 144.7 |
| Reaction temp (°C.) | 130° | 130 | 130 | 130 | 130 | 130 |
| Acid No. | 2.15 | 16.65 | 17.4 | 0 | 0.27 | 0.11 |
| pH | 4.69 | 3.37 | 3.36 | 7.12 | 5.93 | 8.3 |
| Hydroxyl No. | 212 | 169 | 168 | 215 | 215 | 210.5 |
| Bromine (wt %) | 45.06 | 45.34 | 45.49 | 44.97 | 45.44 | 46.28 |
| Appearance |  | slight haze | clear | clear | very slight haze | very hazy |

[1]Sodium acetate
[2]Equivalents acetate per equivalent $H_2SO_4$

Surprisingly other alkali metal fatty acid salts are not equivalent to the potassium salts in the present process. Example 7 was conducted following the standard procedure (cf Example 5) but using sodium acetate as the neutralization agent.

The following table gives some pertinent data from the above examples.

|  | Example No. | | | | | |
| --- | --- | --- | --- | --- | --- | --- |
|  | 1 | 3 | 4 | 5 | 6 | 7 |
| Catalyst theories[1] | 1.30 | 0.62 | 0.43 | 1.11 | 1.12 | 1.11[2] |
| Hydroxyl No. | 220 | 169 | 168 | 215 | 215 | 211 |
| Acid No. | 0.02 | 16.65 | 17 | 0.00 | 0.27 | 0.11 |
| pH | 7.1 | 3.37 | 3.4 | 7.1 | 5.9 | 8.3 |
| Color | yellow | off white | yellow | amber | pink-amber | amber |
| Clarity | moderate haze | slight haze | clear | clear | very slight haze | very hazy |

[1]Equivalents K salt per equiv. $H_2SO_4$
[2]Substituted Na acetate

As the results show, the sodium acetate salt (Example 7) was an effective neutralizing agent but the product was very hazy. All of the reaction products neutralized with the potassium salt were clear or had at most a moderate haze. The best results used about 1.0–1.3 equivalents of potassium acetate per equivalent of residual $H_2SO_4$ in the cyclic anhydride and more preferably about 1.1–1.2 equivalents of potassium acetate per equivalent of residual $H_2SO_4$.

The halogenated polyols of this invention are useful as reactive flame retardants in polymer systems that react with hydroxyl groups such as in polyester systems and polyurethane systems. They are especially useful in making flame retarded polyurethane foams. When used to make such polymer compositions the clarity of the polymer mixture was found to reflect the clarity of the halogenated polyol fire retardant.

I claim:

1. A process for making a flame retarded halogenated polyol by (a) reacting 0.5–10 equivalents of an aliphatic polyol with 1 equivalent of a halogenated cyclic acid anhydride in the presence of a potassium salt of a $C_{2-4}$ fatty acid to form an acid-ester intermediate and (b) reacting 0.5–20 equivalents of an epoxide with said acid-ester intermediate to form said flame retardant halogenated polyol, said halogenated cyclic acid anhydride containing about 0.1–0.3 weight percent residual sulfuric acid, the amount of said potassium salt being at least sufficient to substantially neutralize said residual sulfuric acid to give a halogenated polyol having a pH of about 5.0–9.0 and which is substantially haze-free.

2. A process of claim 1 wherein said halogenated cyclic acid anhydride is selected from halogenated phthalic anhydrides and halogenated bicyclo-(2,2,1)-5-heptene-2,3-dicarboxylic anhydride.

3. A process of claim 2 wherein said halogenated cyclic acid anhydride is selected from tetrahalophthalic anhydride and 1,4,5,6,7,7-tetrahalo-bicyclo-(2,2,1)-5-heptene-2,3-dicarboxylic anhydride.

4. A process of claim 3 wherein said fatty acid salt is potassium acetate.

5. A process of claim 4 wherein said halogenated cyclic acid anhydride is tetrabromophthalic anhydride.

6. A process of claim 4 wherein said cyclic anhydride is 1,4,5,6,7,7-hexabromo-bicyclo-(2,2,1)-5-heptene-2,3-dicarboxylic anhydride.

7. A process of claim 1 wherein said aliphatic polyol is an aliphatic diol.

8. A process of claim 7 wherein said aliphatic diol is a polyalkylene glycol.

9. A process of claim 8 wherein said polyalkylene glycol is a polyethylene glycol or mixtures of polyethylene glycols.

10. A process of claim 9 wherein said polyethylene glycol is mainly diethylene glycol.

11. A process of claim 7 wherein said epoxide is selected from ethylene oxide, 1,2-propylene oxide, 1,2- or 2,3-butylene oxide and mixtures thereof.

12. A process of claim 11 wherein said epoxide is 1,2-propylene oxide.

13. A process of claim 12 wherein said aliphatic diol is a polyalkylene glycol or mixture of polyalkylene glycols.

14. A process of claim 13 wherein said polyalkylene glycol is a polyethylene glycol or mixture of polyethylene glycols.

15. A process of claim 1 wherein said potassium salt of a fatty acid is potassium acetate.

16. A process of claim 7 wherein said potassium salt of a fatty acid is potassium acetate.

17. A process of claim 8 wherein said potassium salt of a fatty acid is potassium acetate.

18. A process of claim 9 wherein said potassium salt of a fatty acid is potassium acetate.

19. A process of claim 10 wherein said potassium salt of a fatty acid is potassium acetate.

20. A process of claim 19 wherein said epoxide is 1,2-propylene oxide.

21. A process of claim 5 wherein (1) said potassium acetate is added to 0.9–1.5 equivalents of polyalkylene glycol in an amount at least sufficient to substantially neutralize the residual sulfuric acid in said tetrabromophthalic anhydride, (2) 1.0 equivalents of tetrabromophthalic anhydride is reacted with said polyalkylene glycol and then (3) 1–5 equivalents of propylene oxide is reacted with the resultant reaction mixture.

* * * * *

UNITED STATES PATENT AND TRADEMARK OFFICE
CERTIFICATE OF CORRECTION

PATENT NO. : 4,564,697

DATED : JANUARY 14, 1986

INVENTOR(S) : BURTON J. SUTKER

It is certified that error appears in the above-identified patent and that said Letters Patent is hereby corrected as shown below:

Column 1, line 17, reads "objectionably" and should read -- objectionable --.

Column 1, lines 34-35, read "improvement ment in a" and should read -- improvement in a --.

Column 3, line 2, reads "120°-135°C." and should read -- 125-135°C --.

Column 3, line 15, reads "12°-140°C." and should read -- 125-140°C --.

Signed and Sealed this

Fifteenth Day of April 1986

[SEAL]

Attest:

DONALD J. QUIGG

Attesting Officer

Commissioner of Patents and Trademarks